United States Patent Office

2,842,603
PREPARATION OF PERHALOFLUOROOLEFINS

William T. Miller, Ithaca, N. Y., assignor, by mesne assignments, to Minnesota Mining and Manufacturing Company, St. Paul, Minn., a corporation of Delaware No Drawing. Application March 4, 1955
Serial No. 492,314

17 Claims. (Cl. 260—653)

This invention relates to perhalocarbon compounds and the method fo preparing them. In one aspect, the invention relates to the production of perhalofluoroallyl compounds. In another more particular aspect, the invention relates to the production of perhalofluoroallyl compounds by intermolecular replacements of allylic halogen in unsaturated perhalofluoroallyl compounds. In still another more particular aspect, the invention relates to the production of perfluoroallyl compounds by inter-molecular replacements of allylic fluorine in unsaturated perfluoroallyl compounds. It has been found that perhalocarbon compounds and their derivatives are of value and possess wide utility in various industrial applications serving as protective coating compositions, electrical insulation, dielectrics, lubricants, refrigerants and the like. Typical of these perhalocarbons are the perfluorocarbons and the chloro-derivatives of perfluorocarbon compounds, which may be prepared by the dimerization and addition reactions of fluorine with mono- and di-olefins, by various methods, such as thermal reactions of perhaloolefins. The principal type products obtained from reaction between fluorine and perhaloethylenes are the simple or normal addition product and the dimer addition product. The dimerization reaction is of importance in that it leads to the formation of higher molecular weight compounds from low molecular weight olefins. An example of such a reaction, is the fluorination of difluorodichloroethylene at a temperature between about —70° C. and about —75° C. to give a 40% yield of the dimer addition product ($C_4Cl_4F_6$ or $CF_2ClCFClCFClCF_2Cl$) 1,2,3,4 - tetrachloroperfluorobutane. By-products from this fluorination reaction of CFCl=CFCl comprise, for the most part, butanes containing up to 6 chlorine atoms and ethanes containing from 1 to 4 chlorine atoms. Nearly quantitative conversion of the dimer $C_4Cl_4F_6$ into perfluorobutadiene-1,3 has been accomplished by dechlorination with zinc dust under improved conditions for isolation and recovery of the product. Perfluorobutadiene and the perfluorochlorobutadienes prepared in this manner, may be converted into a variety of perfluoro products by fluorination and polymerization procedures. Dechlorination of the dimer addition product of CFCl=CFCl, $$(CF_2ClCFClCFClCF_2Cl)$$

with zinc dust and dioxane solution may be carried out so as to obtain substantial yields of 1,4-dichloroperfluorobutene-2 ($CF_2ClCF=CFCF_2Cl$) along with perfluorobutadiene-1,3.

Using a Pyrex reactor tube 1" in diameter and heated over a 1' section to a maximum temperature of 550–560° C., trifluorochloroethylene passing through this reactor at the rate of 30–40 grams per hour, reacts to give the following approximate amounts of principal products:

| | Percent |
|---|---|
| $CFCl_2—CF=CF_2$ | 15–25 |
| $CF_2Cl—CF=CF_2$ | 5–10 |
| $CF_2Cl—CFCl—CF=CF_2$ | 35 |
| $CF_2—CFCl—CFCl—CF_2$ | 30 |

High boiling residue ... 5

In other experiments, the ratio of propenes obtained, was approximately 1:1. For example, $CF_2$=CFCl passed at a 45 g./hr. rate through each of six 3 x 30 cm. Pyrex glass reactor tubes of a small-scale pilot plant reacted when heated to 550–560° C. for 15 seconds, to give the following approximate yields of major products:

| | Percent |
|---|---|
| $CF_2$=CF—$CF_2Cl$ | 10 |
| $CF_2$=CF—$CFCl_2$ | 10 |
| $CF_2$—CFCl—CFCl—$CF_2$ | 34 |

| | |
|---|---|
| $CF_2$=CF—CFCl—$CF_2Cl$ | 30 |
| Higher B. P. residue | 5 |
| Lower B. P. by-products | 11 |

These average results were obtained from a total pass of about 20 kilograms of $CF_2$=CFCl in three units with an average conversion of about 70%. At higher temperatures the proportion of propenes in the reaction product is increased.

It will be noted that among the olefinic compounds prepared by the above methods, are those which contain allylic halogen, that is, a halogen atom which is bonded to a carbon atom adjacent to a doubly bonded carbon atom, as exemplified by the compound $$CF_2=CFCF_2Cl$$

in which the chlorine atom is referred to as the allylic chlorine, and is more reactive than the fluorine atoms attached to the same carbon atom. In perfluoro unsaturated compounds, allylic fluorine atoms are also more reactive than the fluorine atoms in the corresponding saturated compound.

It is an object of the present invention to produce perhalofluoroallyl compounds.

Another object of the invention is to provide a method for producing perhalofluoroallyl compounds by a process of intermolecular replacement.

Still another object of the invention is to provide a method for producing perfluoroallyl compounds by a process of intermolecular replacement.

Other objects and advantages inherent in the invention will become apparent from the following more detailed disclosure.

It has now been found, as more fully hereinafter described, that it is possible to bring about selective reaction between allylic halogen in unsaturated perhalocarbons, comprising perhalofluoroallyl halides, and reagents comprising alkali metal fluorides in the presence of a water-soluble solvent, to produce a new class of compounds comprising substituted perhaloallyl compounds by intermolecular replacement of the allylic halogen with the fluorine atom of the alkali metal fluoride. The compounds thus produced are of primary importance in providing a wide variety of useful industrial applications as protective coating polymer compositions, electrical insulation, refrigerants, lubricants, and the like; or as insecticides; or as valuable new synthetic intermediates for the production of other perhalocarbon derivatives of relatively low molecular weight; and as monomers for polymerization to form materials of relatively high molecular weight, particularly useful as lubricants, coating compositions and the like.

A general basis for the preparation of many derivatives of fluorocarbons results from this discovery that allylic chloride in perfluoroolefins is highly reactive with a variety of reagents. For example, the chlorine in such compounds as $CF_2$=CFCF$_2$Cl (3-chloroperfluoropropene-1) reacts in a highly preferential manner as compared with the fluorine atoms attached to the same carbon atom.

According to this invention, in its broad aspect, unsaturated perhalocarbons, viz., perhalofluoroallyl halides having an allylic halogen atom of the group consisting of chlorine, bromine, and iodine, are subjected to allylic replacements by reaction with the aforementioned alkali metal fluorides, viz., lithium fluoride, sodium fluoride, potassium fluoride, rubidium fluoride, and cesium fluoride, to replace the more reactive allylic halogen with the fluorine atom of the alkali metal fluoride and to produce the desired substituted perhalofluoroallyl compound. The replacement reaction is preferably made to take place with chlorine being present as the allylic halogen in perfluorochloroolefins, as exemplified by chlorine in the 3-position in $CF_2=CFCF_2Cl$ (3-chloroperfluoropropene-1) or in $CF_2CClCF_2Cl$ (2,3-dichloroperfluoropropene-1), because of the lower cost of chlorine compounds as compared to the cost of bromines and iodines, although the allylic halogen may also be either bromine or iodine. Thus bromine or iodine may appear as allylic halogen in such compounds as $CF_2=CFCF_2Br$ (3-bromoperfluoropropene-1) and $CF_2=CFCF_2I$ (3-iodoperfluoropropene-1), respectively. The replacement reaction may also be made to take place with allylic halogens being present in perhalofluoroolefins having more than three carbon atoms per molecule, as illustrated by chlorine in the 3-position in 3,4-dichloroperfluorobutene-1 ($CF_2=CFCFClCF_2Cl$), although allylic groupings in such compounds may be somewhat less reactive than the terminal allylic groupings indicated above. In carrying out the replacement reaction between the perhalofluoroallyl halide and the alkali metal fluoride, the reactants may be employed over a wide range of concentrations depending upon the particular reaction being carried out. In general, it is preferred to utilize a considerable excess of the alkali metal fluoride in order to obtain a faster and more complete reaction. However, in instances in which only a partial replacement of the total allylic halogens other than fluorine is desired, it is preferable to utilize an excess of the perhalofluoroallyl halide or in quantities equivalent to the halogen which is to be replaced.

As indicated above the replacement reaction between the perhalofluoroallyl halide and the alkali metal fluoride is carried out in the presence of a water-soluble solvent. For this purpose such water-soluble solvents may be employed as water-soluble alcohols, which include methanol, ethanol, and propanol; dioxane; 1,2-dimethoxyethane; ethylene glycol; glycerol; 1,3- propylene glycol; 1,2-propylene glycol; acetone; methyl ethyl ketone; liquid hydrogen fluoride; formamide; acetamide; propionamide; acetonitrile; nitromethane; nitroethane; methyl cyanide; ethyl cyanide; and 1,2-dicyanoethane.

The solvent employed is one which is preferably in a non-aqueous condition. However, aqueous solutions of water-soluble solvents, or water itself, may be used to advantage in certain cases. It will be understood, of course, that in all instances the solvent employed is preferably one in which the alkali metal fluoride will be soluble therein. In general, the proper quantity of solvent employed will be that amount which is necessary to dissolve the required mol weight of the alkali metal fluoride in the solvent. However, satisfactory reactions may be carried out utilizing sparingly soluble alkali metal fluorides with an excess of the alkali metal fluoride being present so as to maintain at all times a saturated solution, even though a molar quantity of the alkali metal fluoride will not dissolve initially. The salt formed by the reaction should be preferably less soluble than the reactant alkali metal fluoride salt. The ratio of solubilities should be as great as possible. For this reason perhalofluoroallyl chlorides are frequently preferred to the perhalofluoroallyl iodides and perhalofluoroallyl bromides.

The reaction between the perhalofluoroallyl halide containing the allylic halogen, and the alkali metal fluoride is carried out in a suitable mixing vessel with sufficient stirring to insure thorough mixing, so that the allylic halogen to be replaced may be obtained in the form of a fine powdered precipitated salt of the alkali metal. The reaction is carried out at atmospheric pressure and at a temperature between about $-10°$ C. and about $200°$ C., with a temperature between about $5°$ C. and about $100°$ C. being preferred. Complete admixture and reaction between the alkali metal fluoride and the perhalofluoroallyl halide starting material is indicated either by examination of the boiling point at reflux, or by the quantity of precipitated salt, or by failure of additional salt to precipitate, or by other methods for determining the composition of the reaction mixture.

Following the aforementioned complete admixture and reaction, there is obtained a mixture comprising the desired product, namely, the substituted perhalofluoroallyl compound in the solvent and containing an excess of the alkali metal fluoride, as for example in the case of neutral salts where so used, and also the aforementioned precipitate comprising the metallic allylic halogen salt. This mixture is, in general, next filtered to separate the solid metallic allylic halogen salt from the filtrate comprising the desired substituted perhalofluoroallyl product in solvent and excess alkali metal fluoride. This filtrate may also contain some unreacted perhalofluoroallyl halide starting material. The isolation of the products may also be carried out by direct distillation after separation of precipitated salt by filtration, or by direct distillation without filtration, depending upon the particular products and the solvent which are present, the boiling points and stability of the products.

The filtrate thus obtained is preferably next water-washed at room temperature with at least a quantity of water which is sufficient to dissolve the solvent and excess alkali metal fluoride which is present. The resulting water-washed filtrate is then subjected to phase separation to obtain an aqueous phase comprising an aqueous solution of the solvent and alkali metal fluoride, and a non-aqueous or organic phase comprising the desired end-product and any unreacted quantities of the original perhalofluoroallyl halide. In order to separate any quantities of the solvent that may remain in the organic product phase thus separated, it is desirable to wash this phase several times with water; or in some instances when a ketone solvent which forms an addition compound with sodium bisulfite is utilized, a fairly concentrated solution of aqueous sodium bisulfite having a concentration of at least 20% may be employed. Such procedure is of use for certain ketones where the products do not react with the bisulfite. It is also possible, if so desired, to separate any unused portion of the solvent that may remain in the aforementioned organic phase, by direct distillation or drying.

The following examples will serve to illustrate some of the types of substituted perhalofluoroallyl compounds obtainable, and the method of preparing them according to the process of the present invention.

*Example I*

One-half mole of $KF.2H_2O$ (47 grams), 100 ml. methyl alcohol and 0.3 mole (50 grams) of perfluoroallyl chloride, ($CF_2=CFCF_2Cl$), were placed in a reaction flask fitted with an ice-salt cooled reflux head which was connected to a Dry Ice trap, and refluxed for 8 hours. At the end of this time it was found that an estimated 10 to 15 grams of liquid had condensed in the Dry Ice trap. Subsequent distillation yielded a fraction comprising mainly perfluoropropene ($CF_3CF=CF_2$) in an amount of 5 grams, having a boiling point of $-30$ to $-24°$ C., and corresponding to a yield of 11%; and a higher boiling fraction in an amount of 17.5 grams and having a boiling point of $-24$ to $+31°$ C. The $CF_3CF=CF_2$ product was brominated, and the resulting product was washed with sodium bisulfite to yield, after distillation, $$CF_3CBrFCBrF_2$$

having a boiling point of 71.0° C. at 728 mm. $N_D^{20}$ 1.3587. The higher boiling fraction (described above) was found to consist largely of $CF_2=CFCClF_2$. This structure was determined by the fact that chlorination of the aforementioned higher boiling fraction yielded $$CF_2ClCClFCClF_2$$

a known compound.

*Example II*

A reaction similar to that descirbed in Example I above, was carried out with 0.42 mole (70 grams) of $CF_2CFCF_2Cl$, 0.8 mole (75 grams) of $KF_2 \cdot 2H_2O$ and 300 ml. of methyl alcohol in a one-liter reaction flask fitted with a mechanical stirrer, in addition to the reflux head and Dry Ice trap, and refluxed for 4 hours. The mixture was then allowed to stand overnight and then refluxed for an additional 8 hours with water-bath heating (at about 50° C.) $P_2O_5$ was added to the material condensed in the Dry Ice trap to remove methyl alcohol. Subsequent distillation yielded 9 grams of $CF_3CF=CF_2$ having a boiling point of −31° to −28° C. at 735 mm. corresponding to a yield of 14%.

*Example III*

In a manner similar to that shown in Examples I and II, $CF_2=CFCF_2Cl$ is converted in $CF_3CF=CF_2$ by sealing 16 grams of $CF_2=CFCF_2Cl$, 12 grams of anhydrous sodium fluoride and 100 ml. formamide in a glass ampule. Two liquid layers are formed. The resulting mixture is rocked for 24 hours at a temperature of approximately 35° C. Upon opening the ampule, an increased yield of $CF_3CF=CF_2$ is obtained, as compared to the same reaction being carried out with methyl alcohol being employed as the solvent.

*Example IV*

In a manner similar to that shown in Examples I, II, and III, 1,4-dichloroperfluorobutene-2 is reacted with 2 moles of NaF in 350 ml. of formamide in a glass ampule. The resulting mixture is rocked for 36 hours at a temperature of approximately 45° C. Upon opening the ampule, a mixture of perfluorobutene-2 and 1-chloroperfluorobutene-2 is obtained.

Oher reactions for the allylic replacement of perhalofluoroallyl halides having an allylic halogen atom selected from the group consisting of chlorine, bromine, and iodine with an alkali metal fluoride in a polar solvent, to produce substituted perhalofluoroallyl compounds, are carried out in the same manner as illustrated in the examples above. Other illustrative reactions of the process of the present invention are shown below, in which various solvent solutions of alkali metal fluorides are employed at a temperature within the range of 25° C. to 100° C. and preferably between about 25° C. and about 75° C. In these reactions approximately 1.5 moles of alkali metal fluoride are employed per mole of the allylic halogen which is to be replaced; also approximately 100 ml. of solvent are employed per 10–15 grams of alkali metal fluoride.

(1) 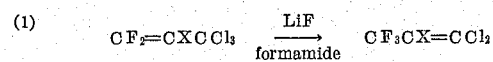

in which X is chlorine, bromine or iodine.

(2) 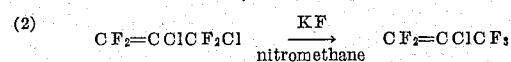

(3) 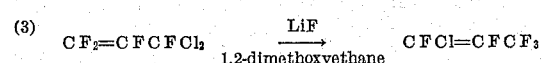

(4) 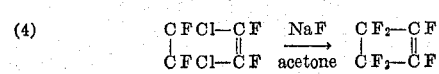

(5) 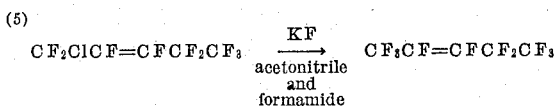

It will be understood, of course, that any of the aforementioned illustrative reactions, involving the allylic replacement of the perhalofluoroallyl halide to produce the substituted perhalofluoroallyl compounds of the present invention, may be carried out employing other perhalofluoroallyl halides and in which other alkali metal salts are substituted for those indicated; and that other water-soluble solvents or mixtures thereof may be substituted for those solvents illustrated, in quantities (in accordance with the foregoing description), which are sufficient to effect reaction between the aforementioned reactants.

Since many embodiments may be made of the present invention, and since many changes may be made in the embodiments described, it is to be understood that the foregoing description is to be interpreted as illustrative only and not in a limiting sense.

I claim:

1. A process which comprises: reacting a perhalofluoroolefin having a halogen atom bonded to a carbon atom adjacent to a doubly bonded carbon atom said halogen atom being selected from the group consisting of chlorine, bromine and iodine with an alkali metal fluoride in a water-soluble solvent at a temperature between about −10° C. and about 200° C., whereby said halogen atom is replaced with the fluorine atom of the alkali metal fluoride to produce a reaction mass comprising a substituted perhalofluoroolefin; and recovering said substituted perhalofluoroolefin from said reaction mass.

2. The process of claim 1 wherein said alkali metal fluoride is lithium fluoride.

3. The process of claim 1 wherein said alkali metal fluoride is sodium fluoride.

4. The process of claim 1 wherein said alkali metal fluoride is potassium fluoride.

5. The process of claim 1 wherein said alkali metal fluoride is rubidium fluoride.

6. The process of claim 1 wherein said alkali metal fluoride is cesium fluoride.

7. The process of claim 1 wherein said solvent is a water soluble alcohol.

8. The process of claim 1 wherein said solvent is methanol.

9. The process of claim 1 wherein said solvent is nitromethane.

10. The process of claim 1 wherein said solvent is acetone.

11. The process of claim 1 wherein said solvent is 1,2-dimethoxyethane.

12. The process of claim 1 wherein said solvent is formamide.

13. A process which comprises: reacting a perhalofluoroolefin having a halogen atom bonded to a carbon atom adjacent to a doubly bonded carbon atom said halogen atom being selected from the group consisting of chlorine, bromine and iodine with an alkali metal fluoride in a water-soluble solvent at a temperature between about 5° C. and about 100° C., whereby said halogen atom is replaced with the fluorine atom of the alkali metal fluoride to produce a reaction mass comprising a substituted perhalofluoroolefin; and recovering said substituted perhalofluoroolefin from said reaction mass.

14. A process which comprises: reacting a perhalofluoroolefin having a halogen atom bonded to a carbon atom adjacent to a doubly bonded carbon atom said halogen atom being selected from the group consisting of chlorine, bromine and iodine with an alkali metal fluoride in a water-soluble solvent at a temperature between about −10° C. and about 200° C., whereby said halogen atom is replaced with the fluorine atom of the alkali metal fluoride to produce a reaction mass comprising a substituted perhalofluoroolefin, solvent and a metallic halogen salt precipitate; recovering said precipitate from said reaction mass; water-washing the remaining mixture comprising said substituted perhalofluoroolefin and solvent, to dissolve said solvent and form an aqueous phase comprising said solvent and an organic phase comprising said substituted perhalofluoroolefin; and separating said phases.

15. A process which comprises: reacting a perhalofluoroolefin having a halogen atom bonded to a carbon atom adjacent to a doubly bonded carbon atom said halogen atom being selected from the group consisting of chlorine, bromine and iodine with an alkali metal fluoride in a water-soluble solvent at a temperature between about −10° C. and about 200° C., whereby said halogen atom is replaced with the fluorine atom of the alkali metal fluoride to produce a reaction mass comprising a substituted perhalofluoroolefin, solvent and a metallic halogen salt precipitate; recovering said precipitate from said reaction mass; water-washing the remaining mixture comprising said substituted perhalofluoroolefin and solvent, to dissolve said solvent and form an aqueous phase comprising said solvent and an organic phase comprising said substituted perhalofluoroolefin; separating said phases; contacting said organic phase with an aqueous solution of sodium bisulfite having a concentration of at least 20% to form addition products with solvent present; and recovering said substituted perhalofluoroolefin from the addition products there formed.

16. A process which comprises: reacting a perhalofluoroolefin having a halogen atom bonded to a carbon atom adjacent to a doubly bonded carbon atom said halogen atom being selected from from the group consisting of chlorine, bromine and iodine with an alkali metal fluoride in a water-soluble solvent at a temperature between about 5° C. and about 100° C., whereby said halogen atom is replaced with the fluorine atom of the alkali metal fluoride to produce a reaction mass comprising a substituted perhalofluoroolefin solvent and a metallic halogen salt precipitate; recovering said precipitate from said reaction mass; water-washing the remaining mixture comprising said substituted perhalofluoroolefin and solvent, to dissolve said solvent and form and aqueous phase comprising said solvent and an organic phase comprising said substituted perhalofluoroolefin; and separating said phases.

17. A process which comprises: reacting a perhalofluoroolefin having a halogen atom bonded to a carbon atom adjacent to a doubly bonded carbon atom said halogen atom being selected from the group consisting of chlorine, bromine and iodine with an alkali metal fluoride in a water-soluble solvent at a temperature between about 5° C. and about 100° C., whereby said halogen fluoride to produce a reaction mass comprising a substituted perhalofluoroolefin, solvent and a metallic halogen salt precipitate; recovering said precipitate from said reaction mass; water-washing the remaining mixture comprising said substituted perhalofluoroolefin and solvent, to dissolve said solvent and form an aqueous phase comprising said solvent and an organic phase comprising said substituted perhalofluoroolefin; separating said phases; contacting said organic phase with an aqueous solution of sodium bisulfite having a concentration of at least 20% to form addition products with solvent present; and recovering said substituted perhalofluoroolefin from the addition products there formed.

References Cited in the file of this patent

UNITED STATES PATENTS

| | | |
|---|---|---|
| 1,914,135 | Lacy | June 13, 1933 |
| 2,558,703 | Gochenour | June 26, 1951 |
| 2,671,799 | Miller | Mar. 9, 1954 |

OTHER REFERENCES

Whaley et al.: J. Am. Chem. Soc., vol. 70, pages 1026–7 (1948).